United States Patent
Hocevar et al.

(12)

(10) Patent No.: US 6,256,724 B1
(45) Date of Patent: Jul. 3, 2001

(54) DIGITAL SIGNAL PROCESSOR WITH EFFICIENTLY CONNECTABLE HARDWARE CO-PROCESSOR

(75) Inventors: Dale E. Hocevar, Plano; Alan Gatherer, Richardson; Carl E. Lemonds, Jr., Garland; Ching-Yu Hung, Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/244,674

(22) Filed: Feb. 4, 1999

Related U.S. Application Data (60) Provisional application No. 60/073,668, filed on Feb. 4, 1998.

(51) Int. Cl.[7] .............................. G06F 13/16; G06F 13/28
(52) U.S. Cl. .............................. 712/35; 712/36; 712/34; 711/112; 711/113
(58) Field of Search .................. 369/13, 116, 124.12; 342/159, 16; 711/169, 170, 112, 113; 381/300, 23, 709; 712/17, 18, 20, 29, 30, 35, 14, 34, 42, 36

(56) References Cited

U.S. PATENT DOCUMENTS

| | | | |
|---|---|---|---|
| 5,590,204 | * | 12/1996 | Lee ........................................ 381/300 |
| 5,706,013 | * | 1/1998 | Melvin et al. ........................ 342/159 |
| 5,805,536 | * | 9/1998 | Gage et al. ............................. 369/13 |

* cited by examiner

*Primary Examiner*—Daniel H. Pan
(74) *Attorney, Agent, or Firm*—Robert D. Marshall, Jr.; W. James Brady, III; Frederick J. Telecky, Jr.

(57) ABSTRACT

A data processing system includes a digital signal processor core and a co-processor. The co-processor has a local memory within the address space of the said digital signal processor core. The co-processor responds commands from the digital signal processor core. A direct memory access circuit autonomously transfers data to and from the local memory of the co-processor. Co-processor commands are stored in a command FIFO memory mapped to a predetermined memory address. Control commands includes a receive data synchronism command stalling the co-processor until completion of a memory transfer into the local memory. A send data synchronism command causes the co-processor to signal the direct memory access circuit to trigger memory transfer out of the local memory. An interrupt command causes the co-processor to interrupt the digital signal processor core.

11 Claims, 7 Drawing Sheets

DIGITAL SIGNAL PROCESSOR WITH EFFICIENTLY CONNECTABLE HARDWARE CO-PROCESSOR

This application claims priority under 35 USC §119(e)(1) of Provisional Application No. 60/073,668, filed Feb. 4, 1998.

TECHNICAL FIELD OF THE INVENTION

The technical field of this invention is digital signal processing and particularly a digital signal processor with a core data processor and a reconfigurable co-processor.

BACKGROUND OF THE INVENTION

Digital signal processing is becoming more and more common for audio and video processing. In many instances a single digital processor can replace a host of prior discrete analog components. The increase in processing capacity afforded by digital signal processors had enabled more types of devices and more functions for prior devices. This process has created the appetite for more complex functions and features on current devices and new types of devices. In some cases this appetite has outstripped the ability to cost effectively deliver the desired functionality with full programmable digital signal processors.

One response to this need is to couple a digital signal processor with an application specific integrated circuit (ASIC). The digital signal processor is programmed to handle control functions and some signal processing. The full programmability of the digital signal processor enables product differentiation through different programming. The ASIC is constructed to provide processing hardware for certain core functions that are commonly performed and time critical. With the increasing density of integrated circuits it is now becoming possible to place a digital signal processor and an ASIC hardware co-processor on the same chip.

This approach has two problems. This approach rarely results in an efficient connection between the hardware co-processor ASIC and the digital signal processor. It is typical to handle most of the interface by programming the digital signal processor. In many cases the digital signal processor must supply data pointers and commands in real time as the hardware co-processor is operating. To form safe designs, it is typical to provide extra time for the digital signal processor to service the hardware co-processor. This means that the hardware co-processor is not fully used. As second problem comes from the time to design problem. With the increasing capability to design differing functionality, the product cycles have been reduced. This puts a premium on designing new functions quickly. The ability to reuse programs and interfaces would aid in shortening design cycles. However, the fixed functions implemented in the ASIC hardware co-processor cannot be easily be reused. The typical ASIC hardware co-processor has a limited set of functions suitable for a narrow range of problems. These designs cannot be quickly reused even to implement closely related functions. In addition the interface between the digital signal processor and the ASIC hardware co-processor tends to use ad hoc techniques that are specific to a particular product.

SUMMARY OF THE INVENTION

This invention is a data processing system including a digital signal processor core and a co-processor. The co-processor has a local memory within the address space of the said digital signal processor core. The co-processor is responsive to commands from the digital signal processor core to perform predetermined data processing operations on data stored in said local memory in parallel with digital signal processor core. The data processing system includes a direct memory access circuit under the control of the digital signal processor core. The direct memory access circuit autonomously transfers data to and from the local memory of the co-processor.

The co-processor responds to commands to configure itself correspondingly to perform a set of related data processing operation. Co-processor commands are stored in a command first in first out memory. The command FIFO memory has an input mapped to a predetermined memory address.

The co-processor is responsive to various control commands. A receive data synchronism command pauses processing commands until the direct memory access circuit signals completion of a memory transfer into the local memory. A send data synchronism command causes the co-processor to signal the direct memory access circuit to trigger a predetermined memory transfer out of the local memory. An interrupt command causes the co-processor to interrupt the digital signal processor core.

Each command includes an indication of a data input location within the local memory. The co-processor recalls data from local memory starting with the indicated data input location. Each command includes an indication of a data output location within the local memory. The co-processor stores resultant data in local memory starting with the indicated data output location. The input data may be stored in a circularly organized memory area serving as an input buffer. The resultant data may be stored in a circularly organized memory area serving as an output buffer.

BRIEF DESCRIPTION OF THE DRAWINGS

These and other aspects of this invention are illustrated in the drawings, in which:

FIG. 5 illustrates an alternative embodiment of the combination of FIG. 1 including two co-processors with a private bus between;

DETAILED DESCRIPTION OF PREFERRED EMBODIMENTS

Figure 1:
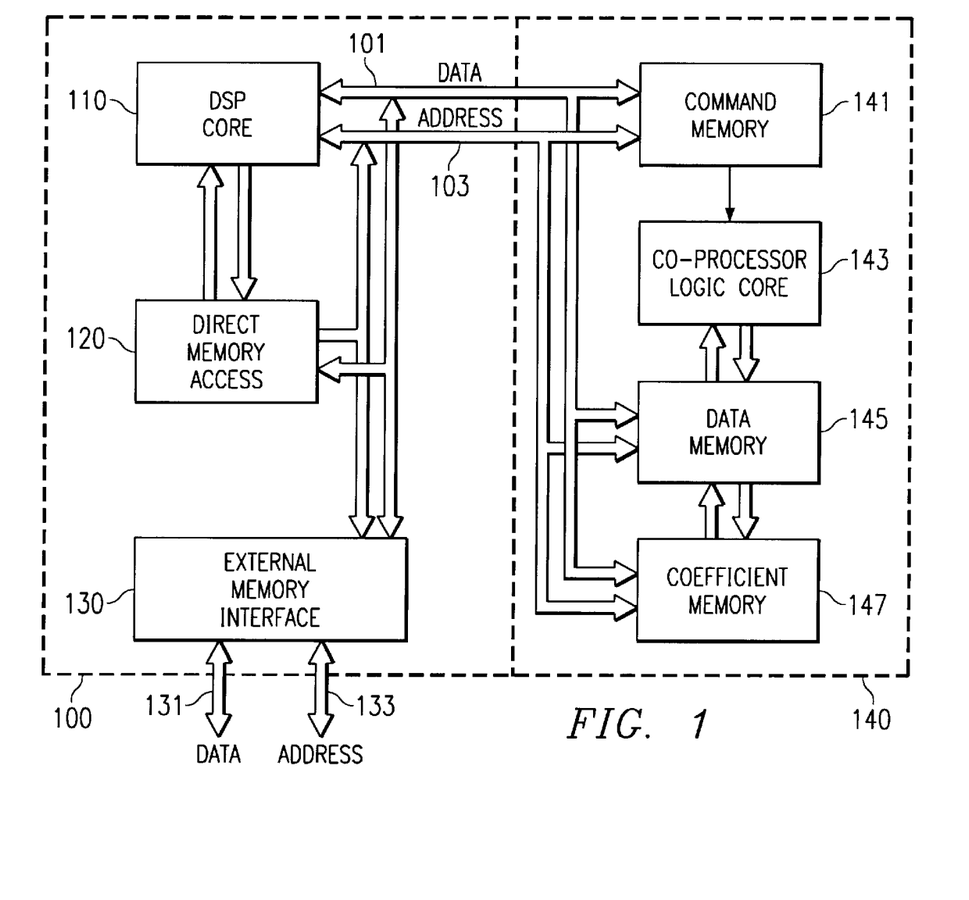
FIG. 1 illustrates the combination of a digital signal processor core and a reconfigurable hardware co-processor in accordance with this invention.

FIG. 1 illustrates circuit 100 including a digital signal processor core 110 and a reconfigurable hardware co-processor 140. In accordance with the preferred embodiment of this invention, these parts are formed in a single integrated circuit. Digital signal processor core 110 may be of conventional design. In the preferred embodiment digital signal processor core 110 is adapted to control direct memory access circuit 120 for autonomous data transfers independent of digital signal processor core 110. External memory interface 130 serves to interface the internal data bus 101 and address bus 103 to their external counterparts external data bus 131 and external address bus 133, respectively. External memory interface 130 is conventional in construction. Integrated circuit 100 may optionally include additional conventional features and circuits. Note particularly that the addition of cache memory to integrated circuit 100 could substantially improve performance. The parts illustrated in FIG. 1 are not intended to exclude the provision of other conventional parts. Those conventional parts illustrated in FIG. 1 are merely the parts most effected by the addition of reconfigurable hardware co-processor 140.

Reconfigurable hardware co-processor 140 is coupled to other parts of integrated circuit 100 via data bus 101 and address bus 103. Reconfigurable hardware co-processor 140 includes command memory 141, co-processor logic core 143, data memory 145 and coefficient memory 147. Command memory 141 serves as the conduit by which digital signal processor core 110 controls the operations of reconfigurable hardware co-processor 140. This feature will be further illustrated in FIG. 2. Co-processor logic core 143 is responsive to commands stored in command memory 141 to perform co-processing functions. These co-processing functions involve exchange of data between co-processor logic core 143 and data memory 145 and coefficient memory 147. Data memory 145 stores the input data processed by reconfigurable hardware co-processor 140 and further stores the resultant of the operations of reconfigurable hardware co-processor 140. The manner of storing this data will be further described below with respect to FIG. 2. Coefficient memory 147 stores the unchanging or relatively unchanging process parameters called coefficients used by co-processor logic core 143. Though data memory 145 and coefficient memory 147 have been illustrated as separate parts, it would be easy to employ these merely as different portions of a single, unified memory. As will be shown below, for the multiple multiply accumulate co-processor described below it is best if such a single unified memory have two read ports for data and coefficients and two write ports for writing the output data. It is believed best that the memory accessible by reconfigurable hardware co-processor 140 be located on the same integrated circuit in physical proximity to co-processor logic core 143. This physical closeness is needed to accommodate the wide memory buses required by the desired data throughput of co-processor logic core 143.

Figure 2:
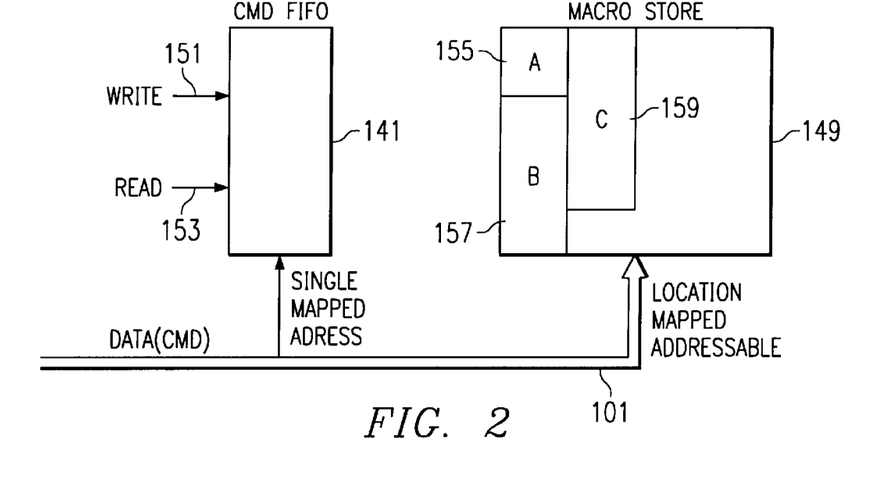
FIG. 2 illustrates the memory map logical coupling between the digital signal processor core and the reconfigurable hardware co-processor of this invention.

FIG. 2 illustrates the memory mapped interface between digital signal processor core 110 and reconfigurable hardware co-processor 140. Digital signal processor core 110 controls reconfigurable hardware co-processor 140 via command memory 141. In the preferred embodiment command memory 141 is a first-in-first-out (FIFO) memory. The write port of command memory 141 is memory mapped into a single memory location within the address space of digital signal processor core 110. Thus digital signal processor core 110 controls reconfigurable hardware co-processor 140 by writing commands to the address serving as the input to command memory 141. Command memory 141 preferably includes two circularly oriented pointers. The write pointer 151 points to the location within command memory 141 where the next received command is to be stored. Each time there is a write to the predetermined address of command memory 141, write pointer selects the physical location receiving the data. Following such a data write, write pointer 151 is updated to point to the next physical location within command memory 141. Write pointer 151 is circularly oriented in that it wraps around from the last physical location to the first physical location. Reconfigurable hardware co-processor 140 reads commands from command memory 141 in the same order as they are received (FIFO) using read pointer 153. Read pointer 153 points to the physical location within command memory 141 storing the next command to be read. Read pointer 153 is updated to reference the next physical location within command memory 141 following each such read. Note that read pointer 153 is also circularly oriented and wraps around from the last physical location to the first physical location. Command memory 141 includes a feature preventing write pointer 151 from passing read pointer 153. This may take place, for example, by refusing to write and sending a memory fault signal back to digital signal processor core 110 when write pointer 151 and read pointer 153 reference the same physical location. Thus the FIFO buffer of command memory 141 can be full and not accept additional commands.

Data memory 145 and coefficient memory 147 are both mapped within the data address space of digital signal processor core 110. As illustrated in FIG. 2, data bus 101 is bidirectionally coupled to memory 149. In accordance with the alternative embodiment noted above, both data memory 145 and coefficient memory 147 are formed as a part of memory 149. Memory 149 is also accessible by co-processor logic core 143 (not illustrated in FIG. 2). FIG. 2 illustrates three circumscribed areas of memory within memory 149. As will be further described below, reconfigurable hardware co-processor 140 preferably performs several functions employing differing memory areas.

Integrated circuit 100 operates as follows. Digital signal processor core 110 controls the data and coefficients used by reconfigurable hardware co-processor 140 by loading the data into data memory 145 and the coefficients into coefficient memory 147. Alternatively, digital signal processor core 110 loads the data and coefficients into the unified memory 149. Digital signal processor core 110 may be programmed to perform this data transfer directly. Digital signal processor core 110 may alternatively be programmed to control direct memory access circuit 120 to perform this data transfer. Particularly for audio or video processing applications, the data stream is received at a predictable rate and from a predictable input device. Thus it would typically be efficient for digital signal processor core 110 to control direct memory access circuit 120 to make transfers from external memory to memory accessible by reconfigurable hardware co-processor 140.

Following the transfer of data to be processed, digital signal processor core 110 signals reconfigurable hardware co-processor 140 with the command for the desired signal processing algorithm. As previously stated, commands are sent to reconfigurable hardware co-processor 140 by a memory write to a predetermined address. Received commands are stored in command memory 141 on a first-in-first-out basis.

Each computational command of reconfigurable hardware co-processor 140 preferably includes a manner to specify the particular function to be performed. In the preferred embodiment, reconfigurable hardware co-processor 140 is constructed to be reconfigurable. Reconfigurable hardware co-processor 140 has a set of functional units, such as multipliers and adders, that can be connected together in differing ways to perform different but related functions. The set of related functions selected for each reconfigurable hardware co-processor will be based upon a similarity of the mathematics of the functions. This similarity in mathematics enables similar hardware to be reconfigured for the plural functions. The command may indicate the particular computation via an opcode in the manner of data processor instructions.

Each computational command includes a manner of specifying the location of the data to be used by the computation. There are many suitable methods of designating the data space. For example, the command may specify a starting address and number of data words or samples within the block. The data size may be specified as a parameter or it may be specified by the opcode defining the computation type. As a further example, the command may specify the data size, the starting address and the ending address of the input data. Note that known indirect methods of specifying where the input data is stored may be used. The command may include a pointer to a register or a memory location storing any of these parameters such as start address, data size, number of samples within the data block and end address.

Each computational command must further indicate the memory address range storing the data for the particular command. This indication may be made by any of the methods listed above with regard to the locations storing the input data. In many cases the computational function will be a filter function and the amount of output data following processing will be about equivalent to the amount of input data. In other cases, the amount of output data may be more or less than the amount of input data. In any event, the amount of resultant data is known from the amount of input data and the type of computational function requested. Thus merely specifying the starting address provides sufficient information to indicate where all the resultant data is to be stored. It is feasible to store the output data in a destructive manner over-writing input data during processing. Alternatively, the output data may be written to a different portion of memory and the input data preserved at least temporarily. The selection between these alternatives may depend upon whether the input data will be reused.

Figure 3:
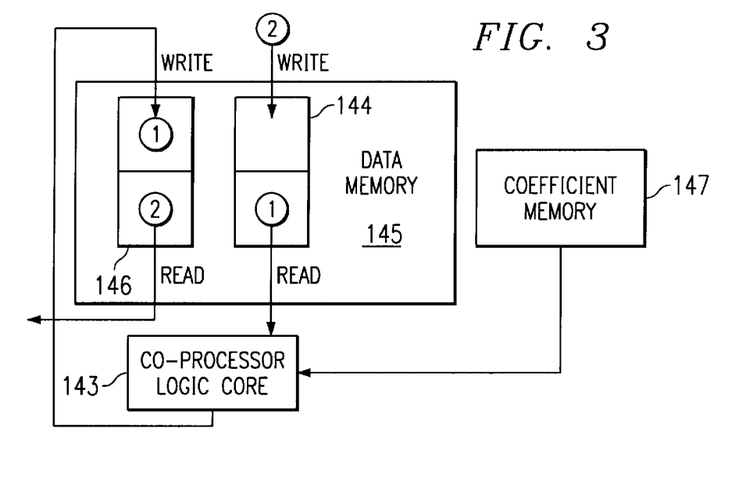
FIG. 3 illustrates a manner of using the reconfigurable hardware co-processor memory.

FIG. 3 illustrates one useful technique involving alternatively employing two memory areas. One memory area 144 stores the input data needed for the co-processor function. The relatively constant coefficients are stored in coefficient memory 147. This data is recalled for use by co-processor logic core 143 (1 read). The output data is written into the second memory area 146 (1 write). Following use of the data memory area 144, direct memory access circuit 120 writes the data for the next block overwriting the data previously used (2 write). At the same time, direct memory access circuit 120 reads data from memory area 146 ahead of it being overwritten by reconfigurable hardware co-processor 140 (2 read). These two memory areas for input data and for resultant data could be configured as circular buffers. In a product that requires plural related functions separate memory areas defined as circular buffers can be employed. One memory area configured as a circular buffer will be allocated to each separate function.

The format of computational commands preferably closely resembles the format of a subroutine call instruction in a high level language. That is, the command includes a command name similar in function to the subroutine name specifying the particular computational function to be performed. Each command also includes a set of parameters specifying options available within the command type. These parameters may take the form of direct quantities or variables, which are pointers to registers or memory locations storing the desired quantities. The number and type of these parameters depend upon the command type. This subroutine call format is important in reusing programs written for digital signal processor core 110. Upon use the programmer or the compiler provides a stub subroutine to activate reconfigurable hardware co-processor 140. This stub subroutine merely receives the subroutine parameters and forms the corresponding co-processor command using these parameters. The stub subroutine then writes this command to the predetermined memory address reserved for command transfer to reconfigurable hardware co-processor 140 and then returns. This invention envisions that the computational capacity of digital signal processor cores will increase regularly with time. Thus the processing requirements of a particular product may require the combination of digital signal processor core 110 and reconfigurable hardware co-processor 140 at one point in time. At a later point in time, the available computational capacity of an instruction set compatible digital signal processor core may increase so that the functions previous requiring a reconfigurable hardware co-processor may be performed in software by the digital signal processor core. The prior program code for the product may be easily converted to the new, more powerful digital signal processor. This is achieved by providing independent subroutines for each of the commands supported by the replaced reconfigurable hardware co-processor. Then each place where the original program employs the subroutine stub to transmit a command to the reconfigurable hardware co-processor is replaced by the corresponding subroutine call. Extensive reprogramming is thus avoided.

Following completion of processing on one block of data, the data may be transferred out of data memory 145 or unified memory 149. This second transfer can take place either by direct action of digital signal processor core 110 reading the data stored at the output memory locations or through the aid of direct memory access circuit 120. This output data may represent the output of the process. In this event, the data is transferred to a utilization device. Alternatively, the output data of reconfigurable hardware co-processor 140 may represent work in progress. In this case, the data will typically be temporarily stored in memory external to integrated circuit 100 for later retrieval and further processing.

Reconfigurable hardware co-processor 140 is then ready for further use. This further use may be additional processing of the same function. In this case, the process described above is repeated on a new block of data in the same way. This further use may be processing of another function. In this case, the new data must be loaded into memory accessible by reconfigurable hardware co-processor 140, the new command loaded and then the processed data read for output or further processing.

Reconfigurable hardware co-processor 140 preferably will be able to perform more than one function of the product algorithm. Many digital signal processing tasks will use plural instances of similar functions. For example, the process may include many similar filter functions. Reconfigurable hardware co-processor 140 preferably has sufficient processing capability to perform all these filter functions in real time. The advantage of operating on blocks of data rather than discrete samples will be evident when reconfigurable hardware co-processor 140 operates in such a system. As an example, suppose that reconfigurable hardware co-processor 140 performs three functions, A, B and C. These functions may be sequential or they may be interleaved with functions performed by digital signal processor core 110. Reconfigurable hardware co-processor 140 first performs function A on a block of data. This function is performed as outlined above. Digital signal processor core 110 either directly or by control of direct memory access circuit 120 loads the data into memory area 155 of memory 149. Upon issue of the command for configuration for function A which specifies the amount of data to be processes, reconfigurable hardware co-processor 140 performs function A and stores the resultant data in the a portion of memory area 155 specified by the command. A similar process occurs to cause reconfigurable hardware co-processor 140 to perform function B on data stored in memory area 157 and return the result to memory area 157. The performance of function may take place upon data blocks having a size unrelated to the size of the data blocks for function B. Finally, reconfigurable hardware co-processor 140 is commanded to perform function C on data within memory area 159, returning the resultant to memory area 159. The block size for performing function C is independent of the block sizes selected for functions A and B.

The usefulness of the block processing is seen from this example. The three functions A, B and C will typically have data flow rates that are independent, that is not necessarily equal. Provision of special hardware for each function will sacrifice the generality of functionality and reusability of reconfigurable hardware. Further, it would be difficult to match the resources granted to each function in hardware to provide a balance and the best utilization of the hardware. When reconfigurable hardware is used there is inevitably an overhead cost for switching between configurations. Operating on a sample by sample basis for flow through the three functions would require a maximum number of such reconfiguration switches. This would clearly be less than optimal. Thus operating each function on a block of data before reconfiguration to switch between functions would reduce this overhead. Additionally, it would then be relatively easy to allocate resources between the functions by selecting the amount of time devoted to each function. Lastly, such block processing would generally require less control overhead from the digital signal processor core than switching between functions at a sample level.

The block sizes selected for the various functions A, B and C will depend upon the relative data rates required and the data sizes. In addition, the tasks assigned to digital signal processor core 110 and their respective computational requirements must also be considered. Ideally, both digital signal processor core 110 and reconfigurable hardware co-processor 140 would be nearly fully loaded. This would result in optimum use of the resources. Such balanced loading of digital signal processor core 110 and reconfigurable hardware co-processor 140 may only be achieved with product algorithms that can use reconfigurable hardware co-processor 140 about 50% of the computations. For the case in which reconfigurable hardware co-processor 140 can perform more that half of the minimum required computations, the additional features implemented on digital signal processor core 110 can be added to the product to match the loading. This would result in use of spare computational resources in digital signal processor core 110. The loading of computational processes may be statically determined. Such static computational allocation can best be made when both digital signal processor core 110 and reconfigurable hardware co-processor 140 perform fixed and known functions. If the computational load is expected to change with time, then it will probably be best to dynamically allocate computational resources between digital signal processor core 110 and reconfigurable hardware co-processor 140 are run time. It is anticipated that the processes performed by reconfigurable hardware co-processor 140 will remain relatively stable and only the processes performed by digital signal processor core 110 would vary.

Figure 4:
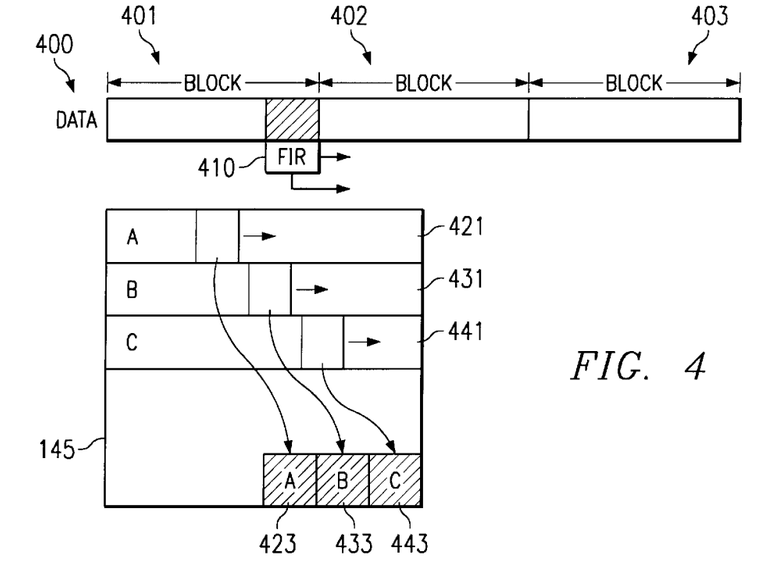
FIG. 4 illustrates a memory management technique useful for filter algorithms.

FIG. 4 shows a memory management technique that enables better interruption of operations. Data 400 consisting of data blocks 401, 402 and 403 passes the window 410 of a finite impulse filter. Such filters operate on a time history of data. Three processes A, B and C operate in respective circular buffers 421, 431 and 441 within data memory 145. Such a circular buffer enables the history to be preserved. Thus when processing the next block following other processing, the history data is available at predictable addresses for use. This history data is just before the newly written data for the next block.

This technique works well except if memory space needs to be cleared to permit another task. In that event, the history data could be flushed and reloaded upon resumption of the filter processing. Alternatively, the history data needed for the next block could be moved to another area of memory 145 or to an external memory attached to external memory interface 130. Either of these methods is disadvantageous because they require time to move data. This either delays servicing the interrupt or resuming the original task.

A preferred alternative is illustrated schematically in FIG. 4. During the writing of the resultant data to its place in memory, the current sample is written to a smaller area of memory. For example, input data from circular buffer 421 is written into history buffer 423, input data from circular buffer 431 is written into history buffer 433, and input data from circular buffer 441 is written into history buffer 443. Each of the history buffers 423, 433 and 443 are just the size needed to store the history according to the width of the corresponding filter window such as filter window 410. Upon completion of processing of a block of data, the most recent history is stored in this restricted area. If the co-processor must be interrupted the data within the circular buffers 421, 431 and 441 may be cleared without erasing the history data stored in history buffers 423, 433 and 443. This technique spares the need for reloading the data or storing the data else where prior to beginning the interrupt task. In many filter tasks enough write memory bandwidth will be available to achieve writing to the history buffers without requiring extra cycles. Another advantage of this technique is that less memory need be allocated to circular buffers 421, 431 and 441 than previously. In the previous technique, the circular buffers must be large enough to include an entire block of data and an additional amount equal to the required history data. The technique illustrated in FIG. 4 enables the size of the circular buffers 421, 431 and 441 to be reduced to just enough to store one block of data.

Many algorithms useful in audio and video signal processing involve adapting coefficients. That is, there is some feedback path that changes the function performed over time. An example of such a algorithms is a modem that requires a time to adapt to the particular line employed and the operation of the far end modem. Initially it would seem that performing such adaptive functions in block mode would adversely effect the convergence of these adaptive functions. Review of the mathematics involved in many such functions shows otherwise. The amount of adaption that can be performed at a particular time generally depends upon the amount of data available for computing the adaption. This amount of available data does not depend upon whether the data is processed sample by sample or in blocks of samples. In practice the rate of adaption will be about the same. Adaption on a sample by sample basis would result in convergence toward the fully adapted coefficients in many small steps. Adaption based upon blocks of data would result in convergence in fewer and larger steps. This is because the greater amount of data available would drive a larger error term for correction in the block processing case. However, the average convergence slope would be the same for the two cases. In cases where most of the adaption takes place upon initialization and most of the processing takes place under steady state conditions, such as the previous modem example, there would be little practical difference. In cases where the adaptive filter must follow a moving target, it is not clear whether adaption on a sample by sample basis is better than adaption of a block basis. If, for example, the process followed varies at a frequency greater than the inverse of the time of the block size, then adaption on a block basis may prevent useless hunting in small steps as compared with sample by sample adaption. Thus adaptive filtering on a block basis has no general disadvantage over adaptive filtering on a sample by sample basis.

The command set of reconfigurable hardware co-processor 140 preferably includes several non-computational instructions for control functions. These control functions will be useful in cooperation between digital signal processor core 110 and reconfigurable hardware co-processor 140. The first of these non-computational commands is a receive data synchronization command. This command will typically be used in conjunction with data transfers handled by direct memory access circuit 120. Digital signal processor core 110 will control the process by setting up the input data transfer through direct memory access circuit 120. Digital signal processors core 110 will send two commands to reconfigurable hardware co-processor 140. The first command is the receive data synchronization command. The second command is the computational command desired.

Reconfigurable hardware co-processor 140 operates on commands stored in command memory 141 on a first-in-first-out basis. Upon reaching the receive data synchronization command reconfigurable hardware co-processor will stop. Reconfigurable hardware co-processor will remain idle until it receives a control signal from direct memory access circuit 120 indicating completion of the input data transfer. Note that upon such completion of this input data transfer, the data for the next block is stored in data memory 145 or unified memory 149. Direct memory access circuit 120 may be able to handle plural queued data transfers. This is known in the art as plural DMA channels. In this case the receive data synchronization command must note the corresponding DMA channel, which would be known to digital signal processor core 110 before transmission of the receive data synchronization command. Direct memory access circuit 120 would transmit the channel number of each completed data transfer. This would permit reconfigurable hardware co-processor 140 to match the completed direct memory access with the corresponding receive data synchronization command. Reconfigurable hardware co-processor would continue to the next command only if a completed direct memory access signal indicated the same DMA channel as specified in the receive data synchronization command.

Following this completion signal, reconfigurable hardware co-processor 140 advances to the next command in command memory 141. In this case this next command is a computational command using the data just loaded. Since this computational command cannot start until the previous receive data synchronization command completes, this assures that the correct data has been loaded.

This combination of the receive data synchronization command and the computational command reduces the control burden on digital signal processor core 110. Digital signal processor core 110 need only set up direct memory access circuit 120 to make the input data transfer and send the pair of commands to reconfigurable hardware co-processor 140. This would assure that the input data transfer had completed prior to beginning the computational operation. This greatly reduces the amount of software overhead required by the digital signal processor core 110 to control the function of reconfigurable hardware co-processor 140. Otherwise, digital signal processor core may need to receive an interrupt from direct memory access circuit 120 signaling the completion of the input data load operation. An interrupt service routine must be written to service the interrupt. In addition, such an interrupt would require a context switch to sent the co-processor command to command memory and another context switch to return from the interrupt. Consequently, the receive data synchronization command frees considerable capacity within digital signal processor core for more productive use.

Another non-computational command is a send data synchronization command. The send data synchronization command is nearly the inverse of the receive data synchronization command. Upon reaching the send data synchronization command, reconfigurable hardware co-processor 140 triggers a direct memory access operation. This direct memory access operation reads data from data memory 145 or unified memory 149 for storage at another system location. This direct memory access operation may be preset by digital signal processor core 110 and is merely begun upon receipt of a signal from reconfigurable hardware co-processor 140 upon encountering the send data synchronization command. In the case in which direct memory access circuit 120 supports plural DMA channels, the send data synchronization command must specify the DMA channel triggered. Alternatively, the send data synchronization command may specify the control parameters for direct memory access circuit 120, including the DMA channel if more than one channel is supported. Upon encountering such a send data synchronization command, reconfigurable hardware co-processor communicates directly with direct memory access circuit 120 to set up and start an appropriate direct memory access operation.

Another possible non-computational command is a synchronization completion command. Upon encountering a synchronization completion command, reconfigurable hardware co-processor 140 sends an interrupt to digital signal processor core 110. Upon receiving such an interrupt, digital signal processor core 110 is assured that all prior commands sent to reconfigurable hardware co-processor 140 have completed. Depending upon the application, it may be better to control via interrupts than through send and receive data synchronization commands. It may also be better to queue several operations for reconfigurable hardware co-processor 140 using send and receive data synchronization commands and then interrupt digital signal processor core 110 at the end of the queue. This may be useful for higher level control functions by digital signal processor core 110 following the queued operations by reconfigurable hardware co-processor.

Figure 5:
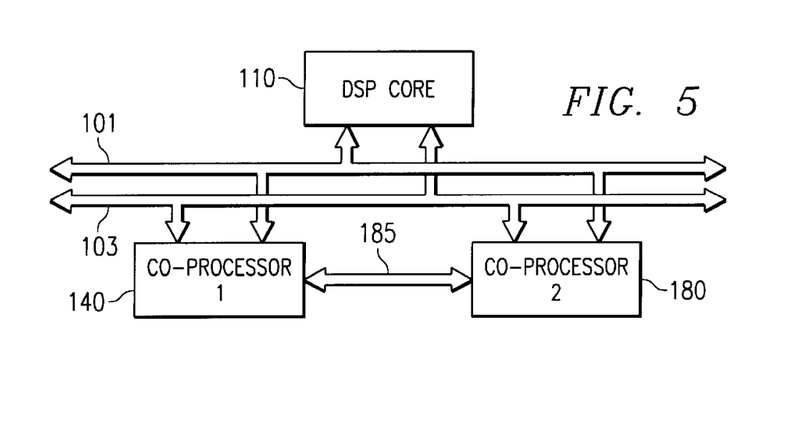

FIG. 5 illustrates another possible arrangement of circuit 100. Circuit 100 illustrated in FIG. 5 includes two reconfigurable hardware co-processors. Digital signal processor core 110 operates with first reconfigurable hardware co-processor 140 and second reconfigurable hardware co-processor 180. A private bus 185 couples first reconfigurable hardware co-processor 140 and second reconfigurable hardware co-processor 180. These co-processors have private memories sharing the memory space of digital signal processor core 110. The data can be transferred via private bus 185 by one co-processor writing to the address range encompassed by the other co-processor's private memory. Alternatively, each co-processor may have an output port directed toward an input port of the other co-processor with the links between co-processors encompassed in private bus 185. This construction may be particularly useful for products in which data flows from one type operation handled by one co-processor to another type operation handled by the second co-processor. This private bus frees digital signal processor core 110 from having to handle the data handoff either directly or via direct memory access circuit 120.

FIGS. 6 to 9 illustrate the construction of an exemplary reconfigurable hardware co-processor. This particular co-processor is called a multiple multiply-accumulator. The multiply-accumulate operation where the sum of plural products is formed is widely used in signal processing. Many filter algorithms are built around these functions.

Figure 6:
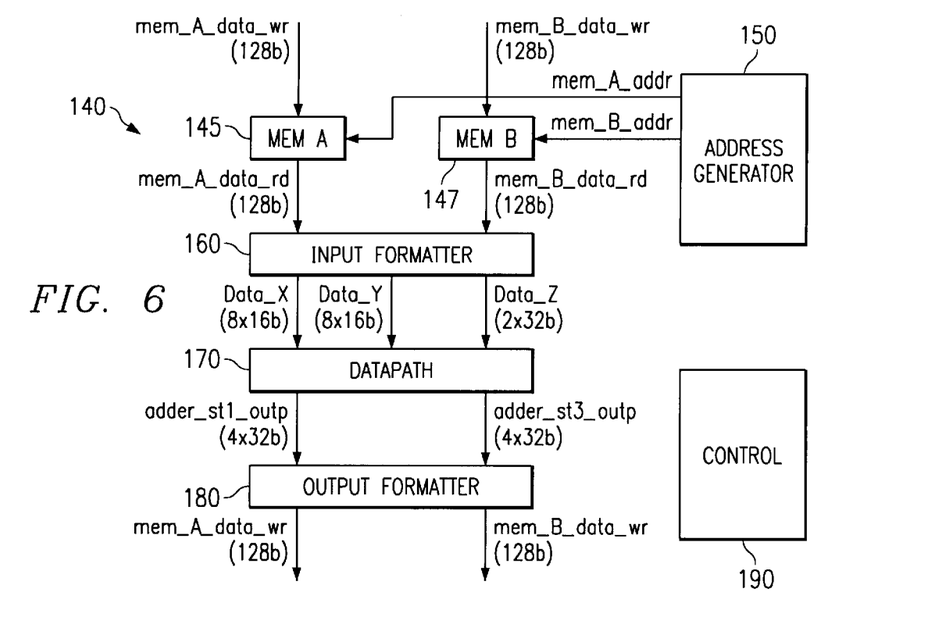
FIG. 6 illustrates the construction of a hardware co-processor which is reconfigurable to perform a variety of filter functions.

FIG. 6 illustrates the overall general architecture of multiple multiply-accumulator 140. Data memory 145 and coefficient memory 147 may be written to in 128 bit words. This write operation is controlled by digital signal processor core 110 or direct memory access circuit 120. Address generator 150 generates the addresses for recall of data and coefficients used by the co-processor. This read operation operates on data words of 128 bits from each memory.

These recalled data words are supplied to input formatter 160. Input formatter 160 performs various shift and alignment operations generally to arrange the 128 bit input data words into the order needed for the desired computation. Input formatter outputs a 128 bit (8 by 16 bits) Data X, a 128 bit (8 by 16 bits) Data Y and a 64 bit (2 by 32 bits) Data Z.

These three data streams are supplied to datapath 170. Datapath 170 is the operational portion of the co-processor. As will be further described below, datapath 170 includes plural hardware multipliers and adders that are connectable in various ways to perform a variety of multiply-accumulate operations. Datapath 170 outputs two adder data streams. Each of these is 4 32 bit data words.

These two data streams supply the inputs to output formatter 180. Output formatter 180 rearranges the two data streams into two 128 bit data word for writing back into the two memories. The addresses for these write operations are computed by address generator 150. This rearrangement may take care of alignment on memory word boundaries.

The operations of co-processor 140 are under control of control unit 190. Control unit 190 recalled the commands from command memory 141 and provides the corresponding control within co-processor 140.

Figure 7:
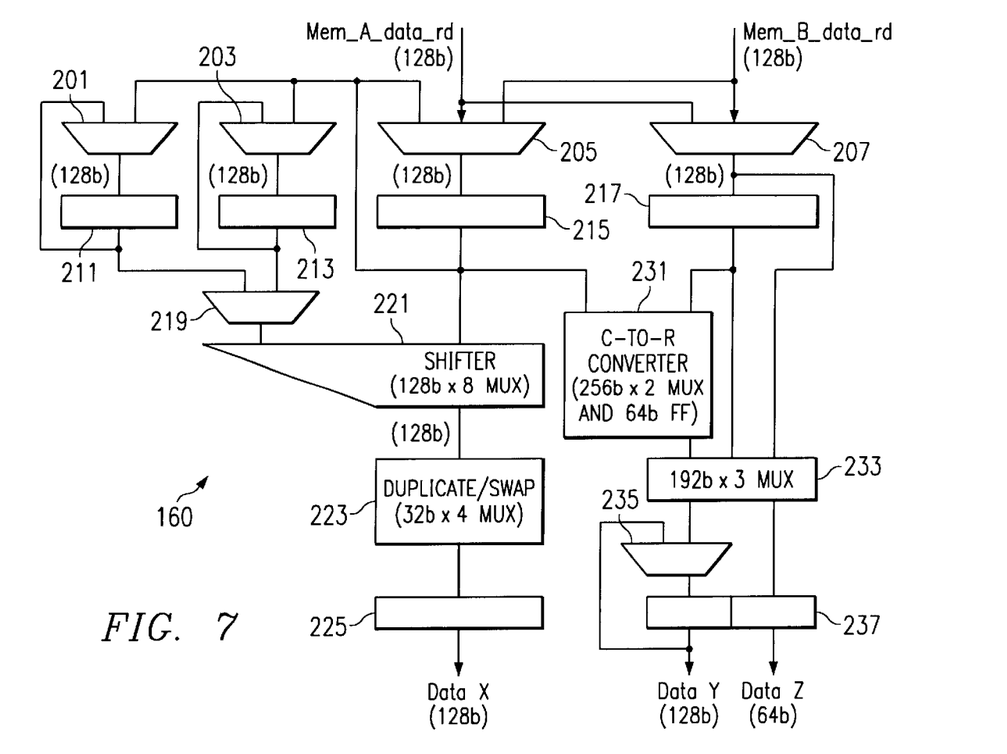
FIG. 7 illustrates the input formatter of the reconfigurable hardware co-processor illustrated in FIG. 6.

The construction of input formatter 160 is illustrated in FIG. 7. Each of the two data streams of 128 bits are supplied to an input of multiplexers 205 and 207. Each multiplexer independently selects one input for storage in its corresponding register 215 and 217. Multiplexer 205 may select to recycle the contents of register 215 as well and either data stream. Multiplexer 207 may only select one of the input data streams. Multiplexers 201 and 203 may select the contents of register 215 or may select recycling of the contents of their respective registers 211 and 213. Multiplexer 129 selects the contents of either register 211 or 213 for supply to the upper bits of shifter 221. The lower bits are supplied from register 215. Shifter 221 shifts and selects only 128 bits of its 256 input bits. These 128 bits are supplied to duplicate/swap unit 223. Duplicate/swap unit 223 may duplication a portion of its input into the full 128 bits or it may rearrange the data order. Thus sorted, the data is temporarily stored in register 225. This forms the Data X input to datapath 170. The output of multiplexer 207 is supplied directly to multiplexer 233 and well as supplied via register 217. Multiplexer 233 selects 192 bits from the bits supplied to it. The upper 128 bits form the Data Y input to datapath 170. These bits may be recirculated via multiplexer 235. The lower 64 bits forms the Data Z input to datapath 170.

Figure 8A:
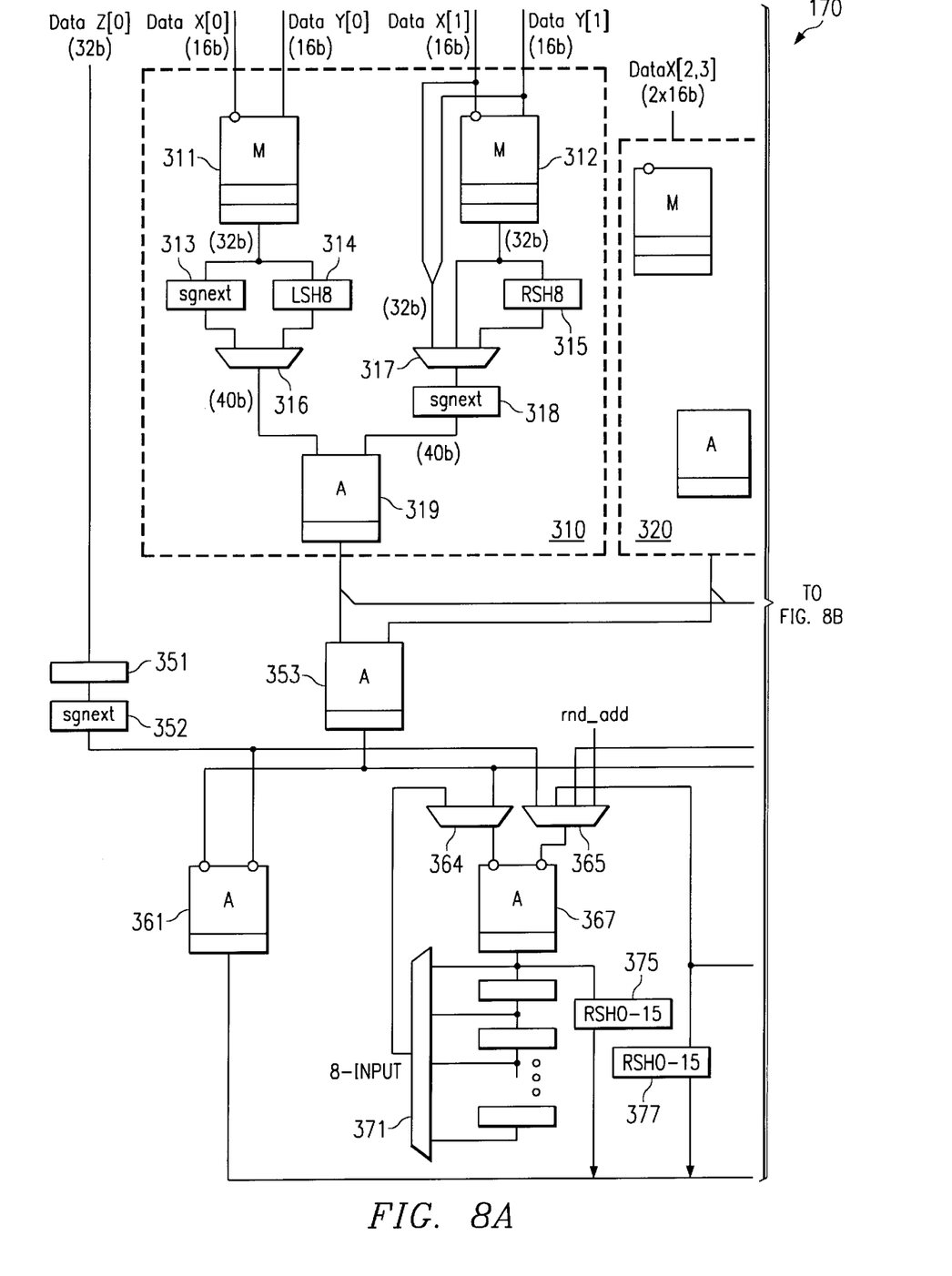
FIGS. 8A, B illustrate the reconfigurable data path core of the reconfigurable hardware co-processor illustrated in FIG. 6.
Figure 8B:
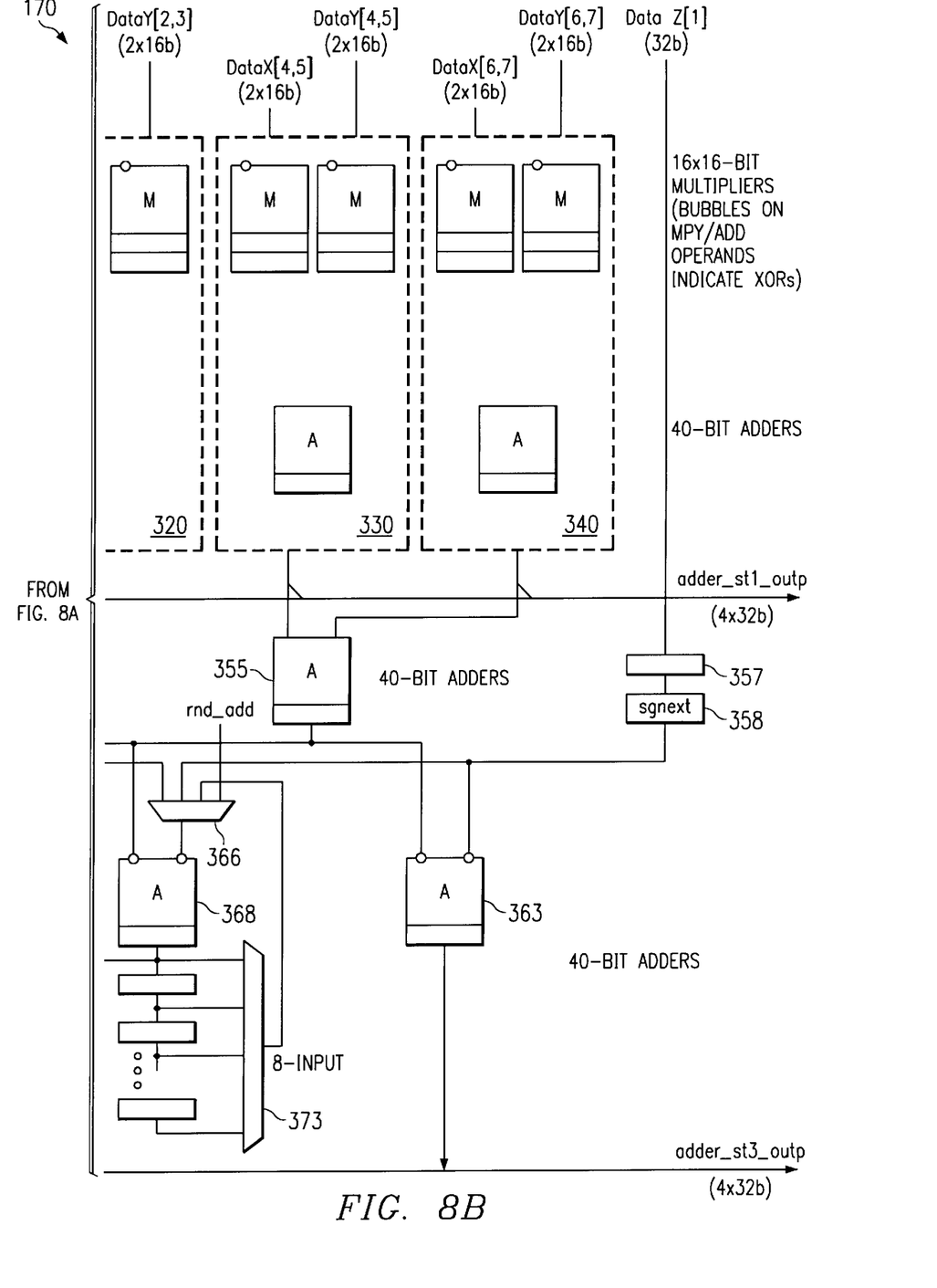

FIG. 8 illustrates in block diagram form the construction of datapath 170. Various segments of the Data X and the Data Y inputs supplied from input formatter are supplied to dual multiply adders 310, 320, 330 and 340. As shown, the first and second 16 bit data words Data X[0:1] and Data Y[0:1] are coupled to dual multiply adder 310, the third and fourth 16 bit data words Data X[2:3] and Data Y[2:3] are coupled to dual multiply adder 320, the fifth and sixth 16 bit data words Data X[4:5] and Data Y[4:5] are coupled to dual multiply adder 330 and the seventh and eighth 16 bit data words Data X[6:7] and Data Y[6:7] are coupled to dual multiply adder 340. Each of these units is identical, only dual multiply adder 310 will be described in detail. The least significant 16 Data X and Data Y bits supply inputs to multiplier 311. Multiplier 311 receives the pair of 16 bit inputs and produces a 32 bit product. This product is stored in a pair of pipeline output registers. The 32 bit output is supplied to both sign extend unit 313 and an 8 bit left shifter 314. Sign extend unit 313 repeats the sign bit of the product, which is the most significant bit, to 40 bits. The 8 bit left shifter 314 left shifts the 32 bit product and zero fills the vacated least significant bits. One of these two 40 bit quantities is selected in multiplexer 316 for application to a first input of 40 bit adder 319. In a similar fashion, the next most significant 16 Data X and Data Y bits are supplied to respective inputs of multiplier 312. Multiplier 312 receives the two 16 bit inputs and produces a 32 bit product. The product is stored in a pair of pipeline registers. The 8 bit right shifter 315 right shifts the product by 8 bits and zero fills the vacated most significant bits. Multiplexer 317 selects from among three quantities. The first quantity is a concatenation of the 16 Data X bits and the 16 Data Y bits at the input. This input allows multiplier 312 to be bypassed. If selected the 32 bits (as sign extended by sign extender 318) are added to the product produced by multiplier 311. The second quantity is the product supplied by multiplier 312. The third quantity is the shifted output of 8 bit right shifter 315. The selected quantity from multiplexer 317 is sign extended to 40 bits by sign extend unit 318. The sign extended 40 bit quantity is the second input to 40 bit adder 319. Adder 319 is provided with 40 bits even though the 16 bit input factors would produce only 32 bits to provide dynamic range for plural multiply accumulates.

The output of the adders 319 within each of the dual multiplier adder units 310, 320, 330 and 340 are provided as the first adder stage output adder_st1_outp. Only the 32 most significant adder output bits is connected to the output. This provides a 4 by 32 bit our 128 bit output.

A second stage of 40 bit adders includes adders 353 and 355. Adder 353 adds the outputs of dual multiply adder units 310 and 320. Adder 355 adds the outputs of dual multiplier adder units 330 and 340. Two other data paths join within the second adder stage. The least significant 32 bits of the Data Z input is temporarily stored in pipeline register 351. This 32 bit quantity is sign extended to 40 bits in sign extend unit 352. In a similar fashion, the most significant bits of the Data Z input is temporarily stored in pipeline register 357. This quantity is sign extended to 40 bits by sign extend unit 358.

The third adder stage includes adders 361, 363, 367 and 368. Adder 361 is 40 bits wide. It adds the output of adder 353 and the sign extended least significant Data Z bits. The 32 most significant bits of this sum are supplied as part of the third stage output adder_st3_outp. Similarly, adder 363 is 40 bits wide and adds the output of adder 355 and the sign extended most significant Data Z bits. The 32 most significant bits of this sum are supplied as part of the third stage output adder_st3_outp. The connections to adders 367 and 368 are much more complicated. The first input to adder 367 is either the output of adder 353 of the second stage or a recirculated output as selected by multiplexer 364. Multiplexer 371 selects from among 8 pipeline registers for the recirculation quantity. The second input to adder 367 is selected by multiplexer 365. This is either the least significant Data Z input as sign extended by sign extend unit 353, the direct output of adder 368, the output of adder 355 or a fixed rounding quantity rnd_add. Addition of the fixed rounding quantity rnd_add causes the adder to round the quantity at the other input. The output of adder 367 supplies the input to variable right shifter 375. Variable right shifter 375 right shifts the sum a selected amount of 0 to 15 bits. The 32 most significant bits of its output forms a part of the third stage output adder_st3_outp. The first input to adder 368 is the output of adder 355. The second input to adder 368 is selected by multiplexer 366. Multiplexer 366 selects either the output of adder 353, the most significant Data Z input as sign extended by sign extend unit 358, the recirculation input or the fixed rounding quantity $rnd_{13}$ add. Multiplexer 373 selects the recirculation quantity from among 8 pipeline registers at the output of adder 368. The output of adder 368 supplies the input to variable right shifter 377. Variable right shifter 377 right shifts the sum a selected amount of 0 to 15 bits. The 32 most significant bits of its output forms another part of the third stage output adder_st3_outp.

Figure 9:
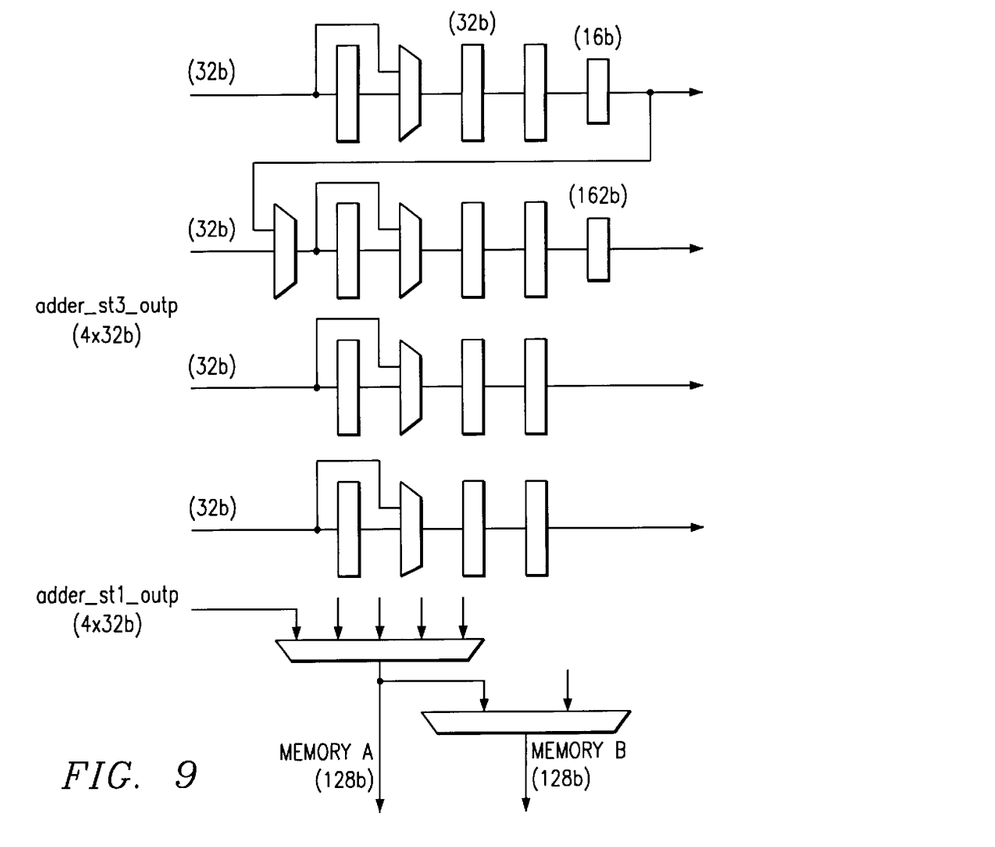
FIG. 9 illustrates the output formatter of the reconfigurable hardware co-processor illustrated in FIG. 6.

FIG. 9 illustrates the construction of the output formatter illustrated in FIG. 6.

FIGS. 10 to 13 illustrate several ways that multiple multiply accumulate co-processor 160 may be configure. The data flow in each of these examples can be achieved by proper selection of the multiplexers within datapath 170. The following description will note the corresponding multiplexer selections when they are relevant to achieving the desired data flow.

Figure 10:
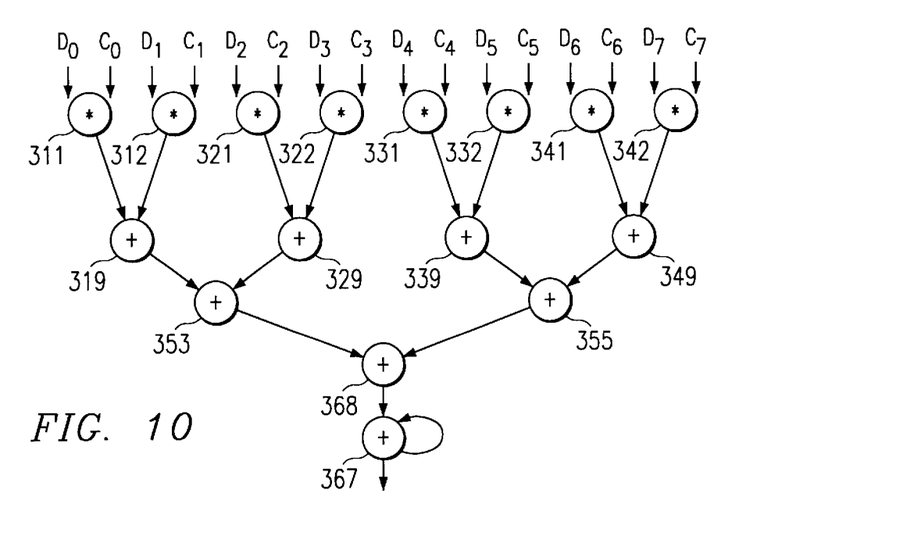
FIG. 10 illustrates the data flow connections through the data path core for performing a real finite impulse response filter.

FIG. 10 illustrates the data flow in a real finite impulse filter (FIR). Data D0 to D7 and coefficients C0 to C7 are supplied to respective multipliers 311, 312, 321, 322, 331, 3332, 341 and 342. In this case multiplexers corresponding to multiplexer 317 in dual multiply adder unit 310 each select the product of the respective multipliers 312, 322, 332 and 342, Pairs of products are summed in adders 319, 329, 339 and 349. Pairs of these sums are further summed in adders 353 and 355. The sums formed by adders 353 and 355 are adder in adder 368. In this case, multiplexer 366 selects the sum produced by adder 353 for the second input to adder 368. Adder 367 does the accumulate operation. Multiplexer 364 selects the output of multiplexer 371, selecting a pipeline register for recirculation, as the first input to adder 363. Multiplexer 365 selects the output of adder 368 and the second input to adder 363. Adder 367 produces the filter output. Note that this data flow produces the sum of the 8 products formed with the prior summed products. This operation is generally known as multiply accumulate and is widely used in filter functions. Configuration of datapath 170 as illustrated in FIG. 7 permits computation of the accumulated sum of 8 products. This greatly increased the throughput in this data flow over the typical single product accumulation provided by digital signal processor core 110.

Figure 11:
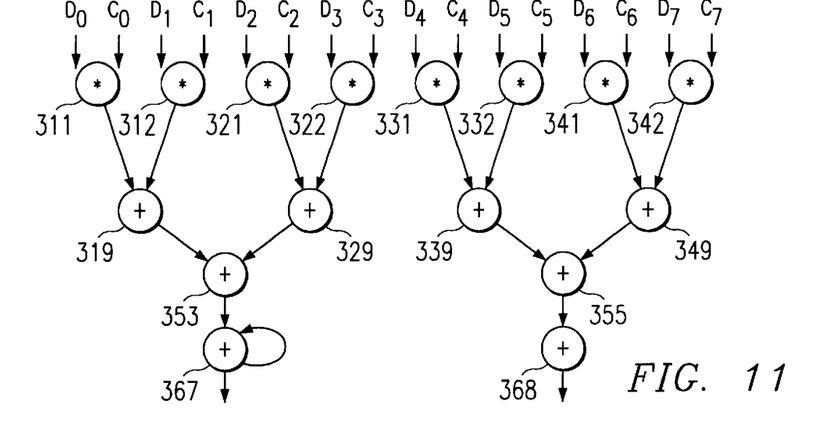
FIG. 11 illustrates the data flow connections through the data path core for performing a complex finite impulse response filter.

FIG. 11 illustrates the data flow of a complex FIR filter. This data flow is similar to that of the real FIR filter illustrated in FIG. 7. The data flow of FIG. 8 simultaneously operates on the real and imaginary parts of the computation. Data and coefficients are supplied to respective multipliers 311, 312, 321, 322, 331, 3332, 341 and 342. Multiplexers corresponding to multiplexer 317 in dual multiply adder unit 310 each select the product of the respective multipliers 312, 322, 332 and 342, Pairs of products are summed in adders 319, 329, 339 and 349. Pairs of these sums are further summed in adders 353 and 355. The real and complex parts are separately handled by adders 367 and 368. Multiplexer 365 selects the sum of adder 353 for the second input to adder 367. Multiplexer 364 selects the output of multiplexer 371, selecting a pipeline register for recirculation, as the first input to adder 363. Adder 368 receives the sum of adder 355 as its first input. Multiplexer 366 selects the recirculation output of multiplexer 373 for the second input to adder 368. The pair of adders 367 and 368 thus produce the real and imaginary parts of the multiply accumulate operation.

Figure 12:
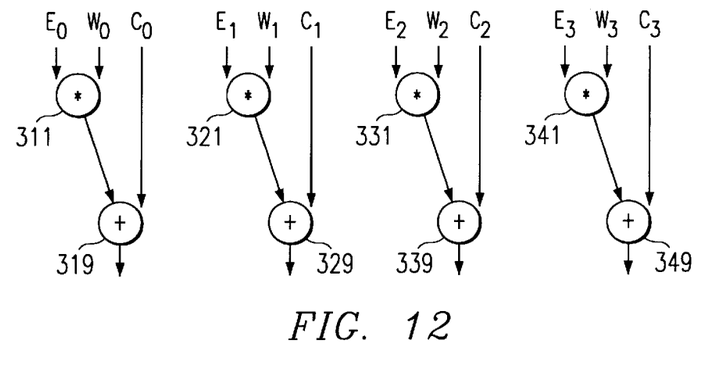
FIG. 12 illustrates the data flow connection through the data path core for performing a coefficient update function.

FIG. 12 illustrates the data flow in a coefficient update operation. The error terms E0 to E3 are multiplied by the corresponding weighting terms W0 to W3 in multipliers 311, 321, 331 and 341. The current coefficients to be updated C0 to C3 are input directly to adders 319, 329, 339 and 349 as selected by multiplexers 317, 327, 337 and 347. The respective products are added to the current values in adders 319, 329, 339 and 349. In this case the output is produced by adders 319, 329, 339 and 349 via the adder stage 1 output adder_st1_outp.

Figure 13:
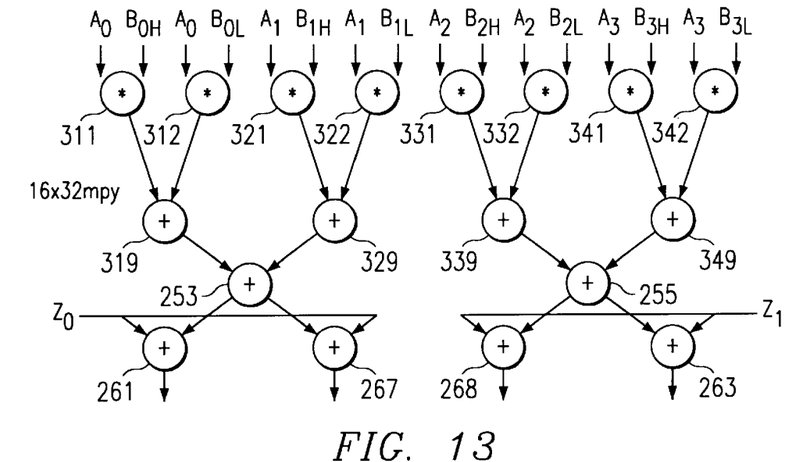
FIG. 13 illustrates the data flow connections through the data path core for performing fast Fourier transform.

FIG. 13 illustrates the data flow in a fast Fourier transform (FFT) operation. The FFT operation starts with a 16 bit by 32 bit multiply operation. This is achieved as follows. Each dual multiply adder 310, 320, 330 and 340 receives a respective 16 bit quantity A0 to A3 at one input of each of the paired multipliers 311 and 312, 321 and 322, 331 and 332, and 341 and 341. Multipliers 311, 321, 331 and 341 receive the 16 most significant bits of the 32 bit quantity B0H to B3H. Multipliers 312, 322, 332 and 342 receive the 16 least significant bits of the 32 bit quantity B0L to B3L. Shifters 314, 315, 324, 325, 334, 335, 344 and 345 are used to align the products. Multiplexers 316, 326, 336 and 346 select the left shifted quantity from respective 8 bit left shifters 314, 324, 334 and 344 for the first input into respective adders 319, 329, 339 and 349. Multiplexers 317, 327, 337 and 347 select the right shifted quantity from respective 8 bit right shifters 315, 325, 335 and 345 as the second inputs to respective adders 319, 329, 339 and 349.

These two oppositely directed 8 bits shifts provide an effective 16 bit shift for aligning the partial products for a 16 bit by 32 bit multiply. Pairs of these sums are further summed in adders 353 and 355. Adder 361 adds the Data Z0 input with the output from adder 353. Multiplexer 364 selects the sum of adder 353 as the first input to adder 367. Multiplexer 365 selects that Data Z0 input as the second input to adder 367. Adder 368 receives the sum of adder 355 as its first input. Multiplexer 366 selects the Data Z1 input as the second input to adder 366. Adder 363 adds the sun of adder 355 and the Data Z1 input. The output of the FFT operation is provided by the sum outputs of adders 361, 367, 368 and 363.

The list below is a partial list of some of the commands that may be performed by the data path 170 of multiple multiply accumulate unit 140 illustrated in FIGS. 3 to 6.

vector_add_16b(len, pdata, pcoeff, pout)
vector_add_32b(len, pdata, pcoeff, pout)
vector_mpy_16b(len, pdata, pcoeff, pout)
vector_mpy_1632b(len, pdata, pcoeff, pout)
vector_mpy_32b(len, pdata, pcoeff, pout)
scalar_vector_add_16b(len, pdata, pcoeff, pout)
scalar_vector_add_32b(len, pdata, pcoeff, pout)
scalar_vector_mpy_16b(len, pdata, pcoeff, pout)
scalar_vector_mpy_1632b(len, pdata, pcoeff, pout)
scalar_vector_mpy_32b(len, pdata, pcoeff, pout)

For these operations, the operation name indicates the data size. The "len" parameter field indicates the length of the function. The "pdata" parameter field is a pointer to the beginning memory address containing the input data. The "pcoeff" parameter field is a pointer to the beginning memory address containing the coefficients for the filter. The "pout" parameter field is a pointer to the beginning memory address to receive the output. As previously described, these pointer preferably point to respective locations within data memory 145 and coefficient memory 147 or unified memory 149.

FFT_real(fft_size, pdata, pcoeff, pout)
FFT_complex(fft_size, pdata, pcoeff, pout)

The fast Fourier transform operations preferably all include 32 bit data and 16 bit coefficients as previously described in conjunction with FIG. 10. The fft_size parameter field defines the size of the function. The other listed parameter fields are as described above.

FIR_real(us, ds, len, blocksize, pdata, pcoeff, pout)
FIR_complex_real(us, ds, len, blocksize, pdata, pcoeff, pout)
FIR_complex_real_sum(us, ds, len, blocksize, pdata, pcoeff, pout)
FIR_complex(us, ds, len, blocksize, pdata, pcoeff, pout)

The finite impulse response filter operations differ in the type of the data and coefficients. The FIR_real operation employs real data and real coefficients. The FIR_complex_real operation employs complex data and real coefficients. The FIR_complex_real_sum operation separately sums the complex and real parts employing complex data and real coefficients. The FIR_complex operation employs both complex data and complex coefficients. The us parameter field indicates the upsampling ratio. The ds parameter field indicates the down sampling ratio. The blocksize parameter field indicates that size of the operational blocks employed. The other parameter fields are as previously described.

The parameters of all these commands could be either immediate values or, for the data, coefficient and output locations, 16 bit address pointers into the co-processor memory. This selection would mean that the finite impulse filter commands, which are the longest, would require about five 16 bit command words. This would be an insignificant amount of bus traffic. Alternatively, the parameter fields could be indirect, that is identify a register from a limited set of registers for each parameter. There could be a set of 8 registers for each parameter, requiring only 3 bits each within the command word. Since only a limited number of particular filter settings would be required, this is feasible.

What is claimed is:

1. A data processing system disposed on a single integrated circuit comprising:
   a data bus;
   an address bus;
   a digital signal processor core connected to said data bus and said address bus, said digital signal processing core operable to generate co-processor commands;
   a co-processor connected to said data bus, said address bus and said digital signal processing core, said co-processor having a local memory within the address space of said digital signal processor core and responsive to commands generated by said digital signal processor core to perform predetermined data processing operations on data stored in said local memory in parallel to said digital signal processor core; and
   a direct memory access circuit under the control of said digital signal processor capable of autonomously transferring data between predefined addresses in memory including transferring data to and from said local memory of said co-processor.

2. The data processing system of claim 1, wherein:
   said co-processor is responsive to a receive data synchronism command to pause processing commands until said direct memory access circuit signals completion of a predetermined memory transfer of data into said local memory.

3. The data processing system of claim 1, wherein:
   said co-processor is responsive to a send data synchronism command to signal said direct memory access circuit to trigger a predetermined memory transfer of data out of said local memory.

4. A data processing system disposed on a single integrated circuit comprising:
   a data bus;
   an address bus;
   a digital signal processor core connected to said data bus and said address bus, said digital signal processing core operable to generate co-processor commands;
   a co-processor connected to said data bus, said address bus and said digital signal processing core, said co-processor having a local memory within the address space of said digital signal processor core and responsive to commands generated by said digital signal processor core to perform predetermined data processing operations on data stored in said local memory in parallel to said digital signal processor core; and
   said co-processor further includes a command first in first out memory having a input responsive to data written to a predetermined memory address and an output controlling operation of said co-processor.

5. A data processing system disposed on a single integrated circuit comprising:
   a data bus;
   an address bus;

a digital signal processor core connected to said data bus and said address bus, said digital signal processing core operable to generate co-processor commands;

a co-processor connected to said data bus, said address bus and said digital signal processing core, said co-processor having a local memory within the address space of said digital signal processor core and responsive to commands generated by said digital signal processor core to perform predetermined data processing operations on data stored in said local memory in parallel to said digital signal processor core; and said co-processor is responsive to said commands to configure itself correspondingly whereby said co-processor is operable to perform a set of related data processing operation.

6. A data processing system disposed on a single integrated circuit comprising:

a data bus;

an address bus;

a digital signal processor core connected to said data bus and said address bus, said digital signal processing core operable to generate co-processor commands;

a co-processor connected to said data bus, said address bus and said digital signal processing core, said co-processor having a local memory within the address space of said digital signal processor core and responsive to commands generated by said digital signal processor core to perform predetermined data processing operations on data stored in said local memory in parallel to said digital signal processor core; and said co-processor is responsive to an interrupt command to transmit an interrupt signal to said digital signal processor core.

7. A data processing system disposed on a single integrated circuit comprising:

a data bus;

an address bus;

a digital signal processor core connected to said data bus and said address bus, said digital signal processing core operable to generate co-processor commands;

a co-processor connected to said data bus, said address bus and said digital signal processing core, said co-processor having a local memory within the address space of said digital signal processor core and responsive to commands generated by said digital signal processor core to perform predetermined data processing operations on data stored in said local memory in parallel to said digital signal processor core;

each command includes an indication of a data input location within said local memory; and said co-processor is responsive to said commands to recall data from said local memory starting with said indicated data input location.

8. A data processing system disposed on a single integrated circuit comprising:

a data bus;

an address bus;

a digital signal processor core connected to said data bus and said address bus, said digital signal processing core operable to generate co-processor commands;

a co-processor connected to said data bus, said address bus and said digital signal processing core, said co-processor having a local memory within the address space of said digital signal processor core and responsive to commands generated by said digital signal processor core to perform predetermined data processing operations on data stored in said local memory in parallel to said digital signal processor core;

each command includes an indication of a data output location within said local memory; and said co-processor is responsive to said commands to store resultant data from a data processing operation corresponding to said command in local memory starting with said indicated data input location.

9. A method of data processing comprising the steps of:

disposing a local memory within a co-processor having addresses within a memory map of a digital signal processor core;

transferring data to said local memory by storing data in a next location in a circularly organized memory area serving as an input buffer;

transmitting a command to said co-processor thereby causing said co-processor to perform a corresponding data processing operation in parallel to said digital signal processor core and store results in said local memory; and transferring said results out of said local memory of said co-processor.

10. A method of data processing comprising the steps of:

disposing a local memory within a co-processor having addresses within a memory map of a digital signal processor core;

transferring data to said local memory;

transmitting a command to said co-processor thereby causing said co-processor to perform a corresponding data processing operation in parallel to said digital signal processor core and store results in said local memory by storing data in a next location in a circularly organized memory area serving as an output buffer.

11. The method of claim 10, further comprising:

storing input data within a circularly organized history buffer having a size corresponding to a time extent of said corresponding data processing operation substantially concurrently with said step of storing results in said local memory.

* * * * *